United States Patent
Sakamoto et al.

(10) Patent No.: US 12,449,807 B2
(45) Date of Patent: Oct. 21, 2025

(54) VEHICLE MANAGEMENT SYSTEM AND VEHICLE

(71) Applicant: TOYOTA JIDOSHA KABUSHIKI KAISHA, Toyota (JP)

(72) Inventors: Shoji Sakamoto, Shizuoka-ken (JP); Kazumi Tsuchiya, Gotemba (JP); Makoto Matsushita, Ichinomiya (JP); Takeshi Takemoto, Nagoya (JP); Shunsuke Sagara, Nisshin (JP); Hideaki Shiraishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 18/451,309

(22) Filed: Aug. 17, 2023

(65) Prior Publication Data
US 2024/0192681 A1    Jun. 13, 2024

(30) Foreign Application Priority Data
Dec. 12, 2022   (JP) .................................. 2022-198181

(51) Int. Cl.
G05D 1/00   (2024.01)
B60L 58/10   (2019.01)
F24S 20/00   (2018.01)

(52) U.S. Cl.
CPC ............ *G05D 1/0027* (2013.01); *B60L 58/10* (2019.02); *F24S 20/00* (2018.05)

(58) Field of Classification Search
CPC ............................... G05D 1/0027; F24S 20/00
See application file for complete search history.

(56) References Cited

U.S. PATENT DOCUMENTS

2022/0134903 A1*   5/2022   Nubbe .................... B64C 39/04
320/134

FOREIGN PATENT DOCUMENTS

JP   2020-135187 A   8/2020

* cited by examiner

*Primary Examiner* — Wade Miles
*Assistant Examiner* — Aaron G Cain
(74) *Attorney, Agent, or Firm* — SoraIP, Inc.

(57) ABSTRACT

The vehicle management system includes an exposure amount calculation unit that calculates an exposure amount by ultraviolet rays of the vehicle, a selection unit that selects one vehicle from the plurality of vehicles so that the exposure amount between the vehicles is the same based on the exposure amount, and a dispatch instruction unit that gives an instruction to dispatch the selected vehicle.

5 Claims, 5 Drawing Sheets

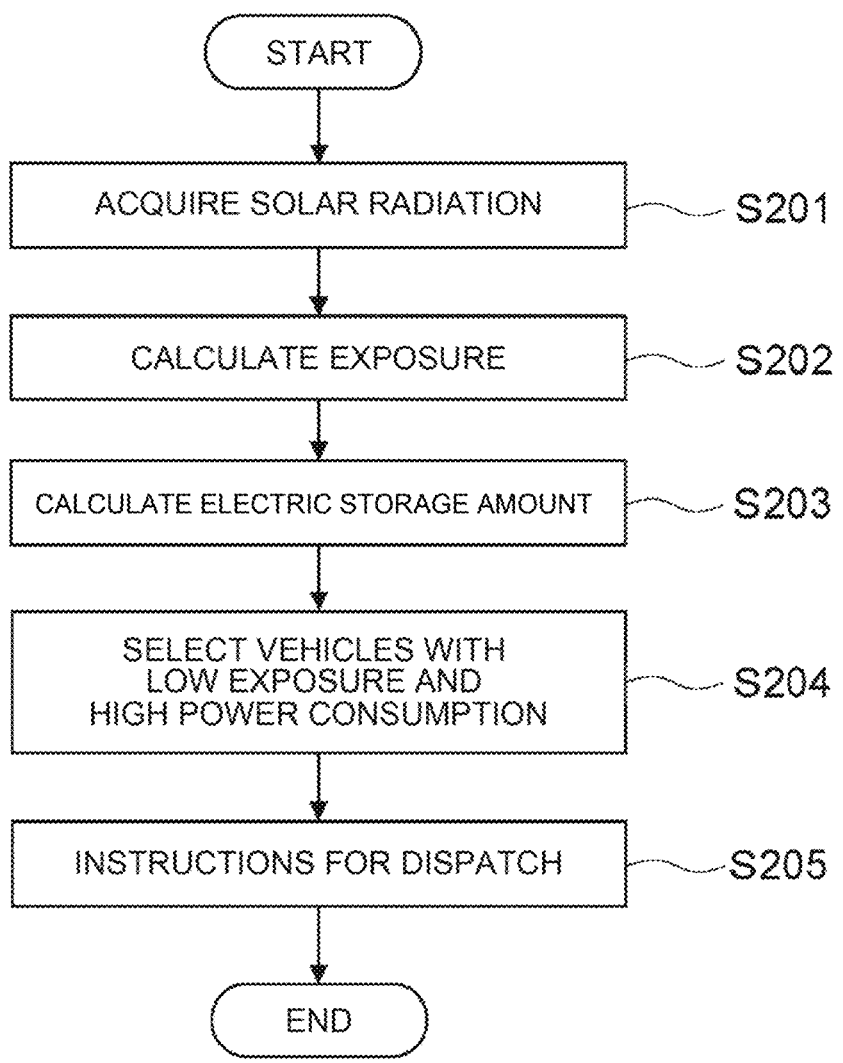

VEHICLE MANAGEMENT SYSTEM AND VEHICLE

CROSS-REFERENCE TO RELATED APPLICATION

This application claims priority to Japanese Patent Application No. 2022-198181 filed on Dec. 12, 2022, incorporated herein by reference in its entirety.

BACKGROUND

1. Technical Field

The present invention relates to a vehicle management system and a vehicle.

2. Description of Related Art

Japanese Unexamined Patent Application Publication No. 2020-135187 (JP 2020-135187 A) discloses a vehicle management system that is configured to select a first vehicle when X>Y holds and select a second vehicle when X<Y holds in the case where a vehicle to be dispatched to a second user is selected after the first vehicle is used by a first user. X is the amount of deterioration of the battery of the first vehicle due to heat in a period on the assumption that the first vehicle is continually in a parking state for a predetermined period. Y is the amount of deterioration of the battery of the first vehicle due to heat in a period on the assumption that the second user uses the first vehicle in a period. Thus, in the vehicle management system that manages a plurality of vehicles, variations in battery life between vehicles are suppressed.

SUMMARY

Incidentally, in a vehicle management system, it is preferable to balance deterioration due to exposure to ultraviolet rays between a plurality of vehicles.

The present invention provides a vehicle management system capable of balancing deterioration due to exposure to ultraviolet rays between a plurality of vehicles.

A vehicle management system according to claim 1 includes: an exposure amount calculation unit that calculates an exposure amount of ultraviolet rays to which a vehicle is exposed; a selection unit that selects one vehicle from a plurality of the vehicles such that the exposure amount is the same between the vehicles based on the exposure amount; and a dispatch instruction unit that gives a dispatch instruction to the selected vehicle.

In the vehicle management system according to claim 1, the system includes: the selection unit that selects one vehicle from a plurality of the vehicles such that the exposure amount between the vehicles is the same based on the exposure amount; and the dispatch instruction unit that gives a dispatch instruction to the selected vehicle, whereby a dispatch instruction is given to a vehicle with a small exposure amount. Therefore, the exposure amount is adjusted to be the same between the vehicles. As a result, it is possible to balance the deterioration due to exposure to ultraviolet rays between the vehicles.

In the vehicle management system according to claim 2, in the vehicle management system according to claim 1, the exposure amount calculated by the exposure amount calculation unit may be an ultraviolet dose of one day×the number of days.

In the vehicle management system according to claim 2, the exposure amount calculated by the exposure amount calculation unit is an ultraviolet dose of one day×the number of days, whereby it is possible to easily measure the exposure amount.

In the vehicle management system according to claim 3, in the vehicle management system according to claim 1, each of the vehicles may include a solar radiation meter that measures a solar radiation amount, and the exposure amount calculation unit may calculate the exposure amount based on the solar radiation amount.

In the vehicle management system according to claim 3, the exposure amount calculation unit can easily measure the exposure amount by calculating the exposure amount based on the solar radiation amount measured by the solar radiation meter.

In the vehicle management system according to claim 4, in the vehicle management system according to claim 1, the vehicle may include a solar panel, and the selection unit may select one vehicle from the vehicles such that an amount of electricity storage by the solar panel between the vehicles is the same.

In the vehicle management system according to claim 4, the selection unit selects one vehicle from the vehicles such that the amount of electricity storage by the solar panel between the vehicles is the same based on the exposure amount, whereby a dispatch instruction is given to a vehicle with a large amount of electricity storage. Therefore, the amount of electricity storage is adjusted to be the same between the vehicles. As a result, it is possible to balance the amount of electricity storage between the vehicles.

A vehicle according to claim 5 is a vehicle managed by the vehicle management system according to any one of claims 1 to 4, and includes a display device that displays the exposure amount.

The vehicle according to claim 5 includes a display device that displays the exposure amount, whereby the exposure amount of ultraviolet rays is displayed on the vehicle. Therefore, for example, the exposure amount of ultraviolet rays can be used as a criterion for maintenance. In addition, the exposure amount of ultraviolet rays can be used as an assessment criterion in the assessment of used vehicles.

As described above, according to the vehicle management system of the present invention, it is possible to balance deterioration due to exposure to ultraviolet rays between a plurality of vehicles.

BRIEF DESCRIPTION OF THE DRAWINGS

Features, advantages, and technical and industrial significance of exemplary embodiments of the invention will be described below with reference to the accompanying drawings, in which like signs denote like elements, and wherein:

FIG. 5 is a flow chart showing a flow of a process performed by the dispatch control device according to the second embodiments.

DETAILED DESCRIPTION OF EMBODIMENTS

First Embodiment

Hereinafter, the vehicle management system 1 including the dispatch management device 20 according to the first embodiment will be described with reference to the drawings. An example in which the vehicle management system 1 according to the first embodiment is a system that manages dispatch of a plurality of vehicles 10 will be described.
Configuration of the Vehicle Management System 1

Figure 1:
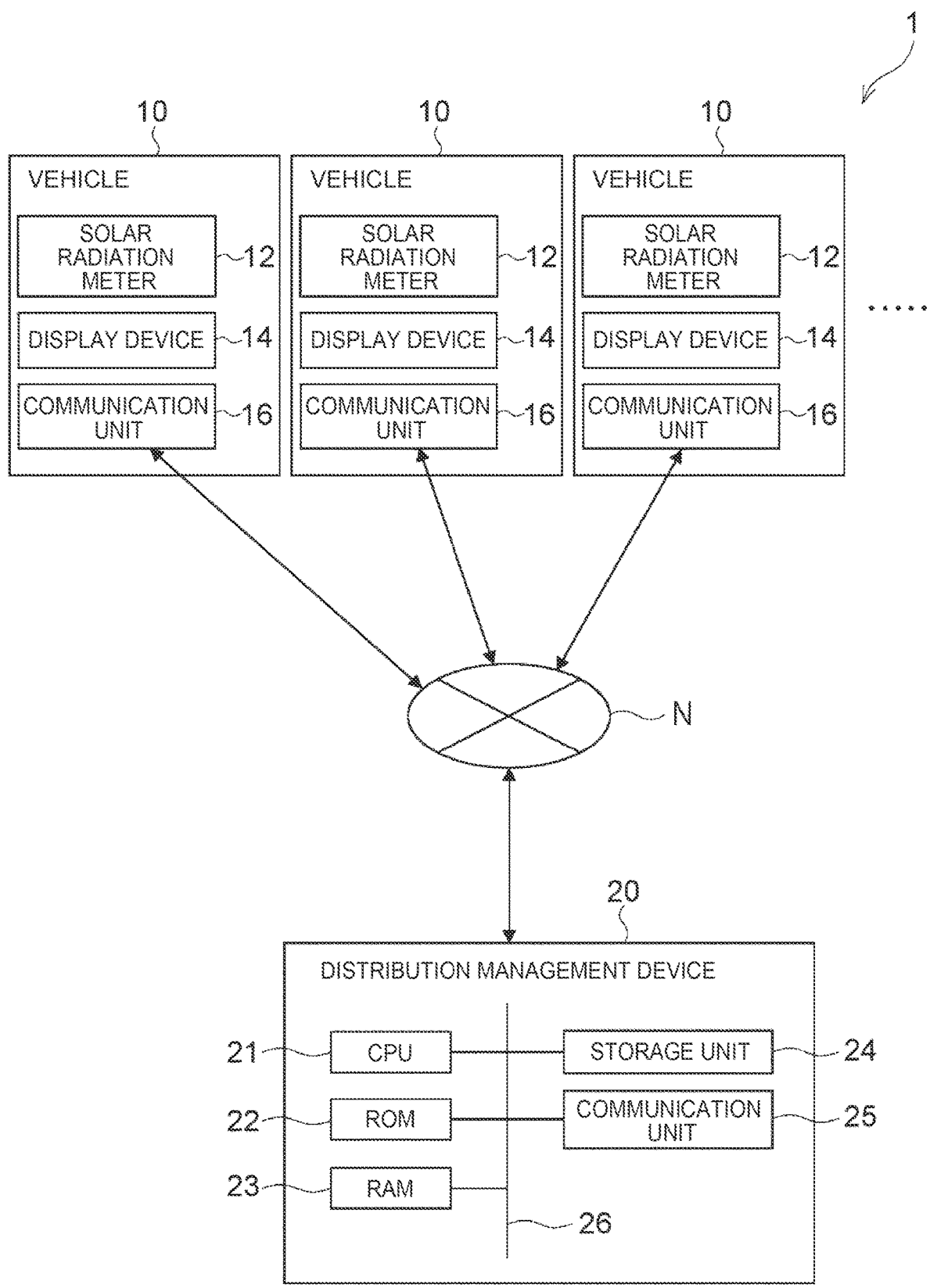
FIG. 1 is a schematic diagram schematically illustrating an entire system according to a first embodiment.

As illustrated in FIG. 1, the vehicle management system 1 includes a plurality of vehicles 10 and a dispatch management device 20. The vehicles 10 and the dispatch management device 20 are connected to each other via a network N, and can communicate with each other.
Vehicle 10

The vehicle 10 includes a solar radiation meter 12 as a measurement meter, a display device 14, and a communication unit 16. The solar radiation meter 12 measures the amount of solar radiation applied to the vehicle 10, and is attached to the outside of the vehicle 10. As the solar radiation meter 12, for example, a thermoelectric element (thermopile) or a photoelectric element (photodiode) can be used.

The display device 14 may be a liquid crystal display provided in a vehicle cabin. The communication unit 16 is an interface for communicating with the dispatch management device 20 via the network N. As the communication by the communication unit 16, for example, standards such as Controller Area Network (CAN), Ethernet (registered trademark), Long Term Evolution (LTE), Fiber Distributed Data Interface (FDDI), and Wi-Fi (registered trademark) are used.
Dispatch Management Device 20

The dispatch management device 20 is installed outside the vehicle 10, for example. The dispatch management device 20 is configured to be able to acquire various kinds of information from the vehicle 10 via the network N.
Hardware Configuration of the Dispatch Management Device 20

As illustrated in FIG. 1, the dispatch management device 20 includes a Central Processing Unit (CPU) 21, a Read Only Memory (ROM) 22, a Random Access Memory (RAM) 23, a storage unit 24, and a communication unit 25. The components are communicably connected to each other via a bus 26.

The CPU 21 is a central processing unit that executes various programs and that controls various units. CPU 21 reads the program from ROM 22 or the storage unit 24, and executes the program using RAM 23 as a working area. CPU 21 performs control of the above-described configurations and various arithmetic processes in accordance with a ROM 22 or a program recorded in the storage unit 24.

The ROM 22 stores various programs and various data. The RAM 23 temporarily stores a program or data as a work area.

The storage unit 24 is configured by a storage device such as a Hard Disk Drive (HDD), Solid State Drive (SSD), or a flash memory, and stores various programs and various data. The storage unit 24 stores the amount of solar radiation of each vehicle 10. The storage unit 24 stores a program for executing a dispatch management process to be described later.

The communication unit 25 is an interface for communicating with the vehicle 10 and other devices via the network N. As the communication by the communication unit 25, for example, standards such as Controller Area Network (CAN, Ethernet (registered trademark), Long Term Evolution (LTE), Fiber Distributed Data Interface (FDDI), and Wi-Fi (registered trademark) are used.
Functional Configuration of the Dispatch Management Device 20

In the dispatch management device 20, the amount of solar radiation measured by the solar radiation meter 12 is input to the control unit 30 via the network N. Then, the processing information on which the dispatch management processing has been executed in the control unit 30 is output to the vehicle 10 via the network N. In the control unit 30, CPU 21 executes a dispatch control process in accordance with a ROM 22 or a program recorded in the storage unit 24.

Figure 2:
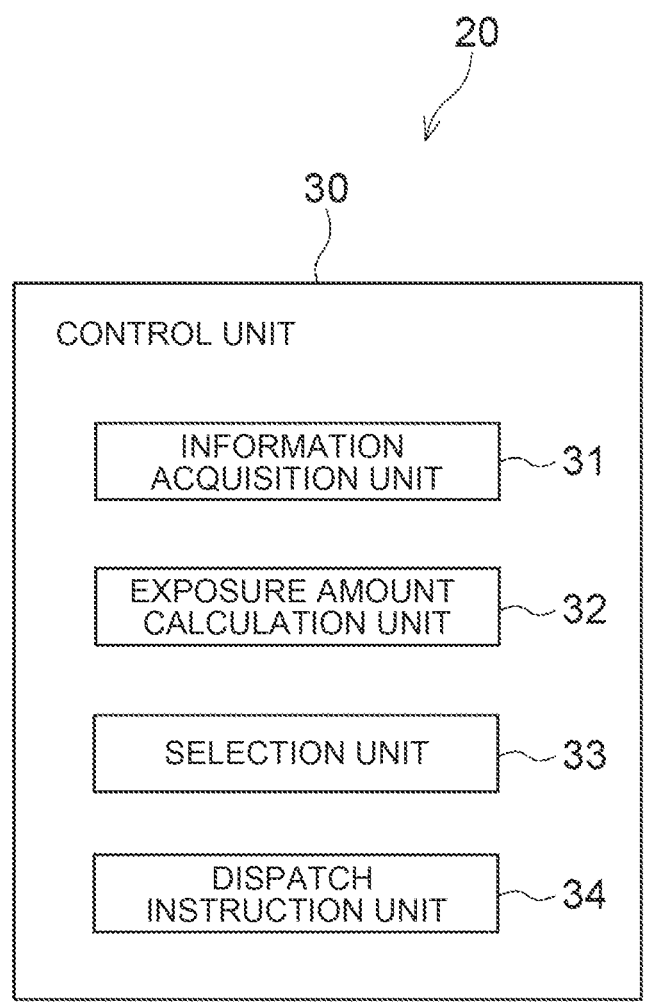
FIG. 2 is a block diagram illustrating a functional configuration of the vehicle dispatch management apparatus according to the first embodiment.

As illustrated in FIG. 2, the control unit 30 functionally includes an information acquisition unit 31, an exposure amount calculation unit 32, a selection unit 33, and a dispatch instruction unit 34.

The information acquisition unit 31 acquires the amount of solar radiation measured by the solar radiation meter 12. The exposure amount calculation unit 32 calculates the cumulative exposure amount that each vehicle 10 has been exposed to (irradiated with) ultraviolet rays up to now, based on the amount of solar radiation measured by the solar radiation meter 12.

Figure 4:
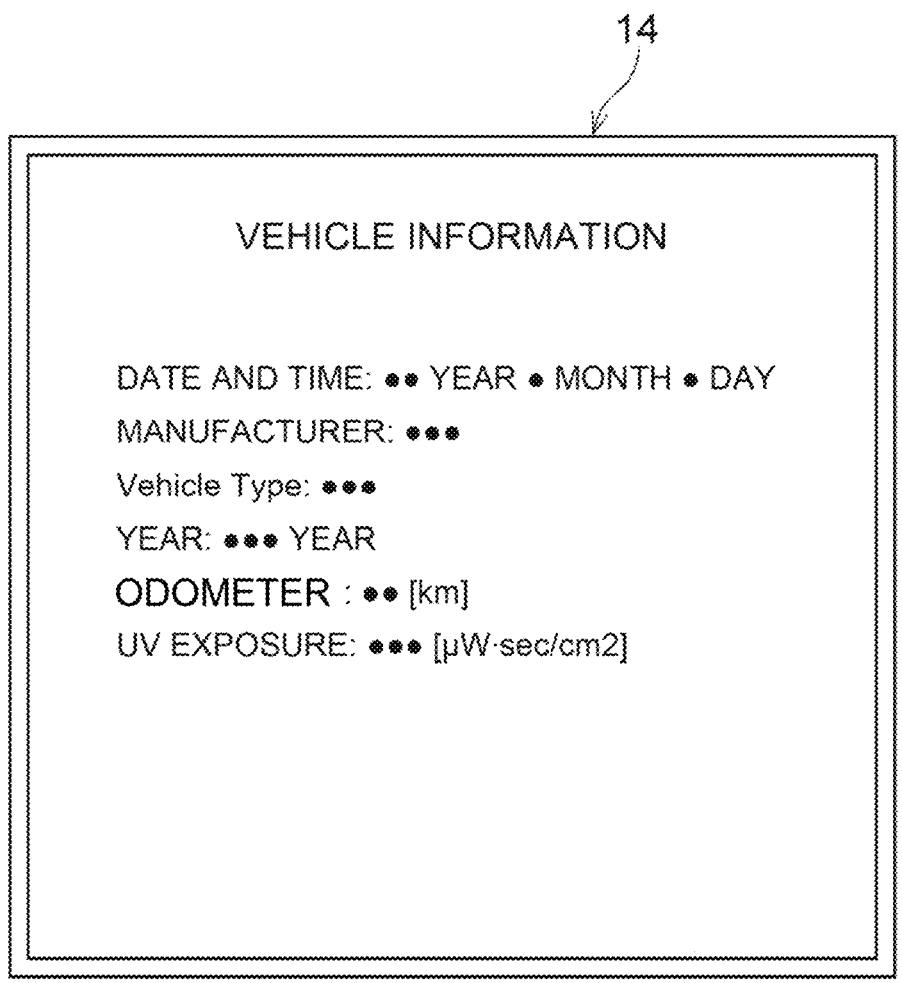
FIG. 4 is a diagram illustrating an exemplary display displayed on the display device according to the first embodiment.

The exposure amount calculated by the exposure amount calculation unit 32 is output to the vehicle 10 and can be displayed on the display device 14 as illustrated in FIG. 4. The exposure amount calculated by the exposure amount calculation unit 32 may be an ultraviolet dose of one day×the number of days.

The selection unit 33 selects a vehicle 10 having a relatively small exposure amount among the plurality of vehicles 10 based on the exposure amount calculated by the exposure amount calculation unit 32. The selection unit 33 selects one vehicle 10 from the plurality of vehicles 10 so that the exposure amounts between the vehicles 10 are the same based on the exposure amounts calculated by the exposure amount calculation unit 32.

Figure 3:
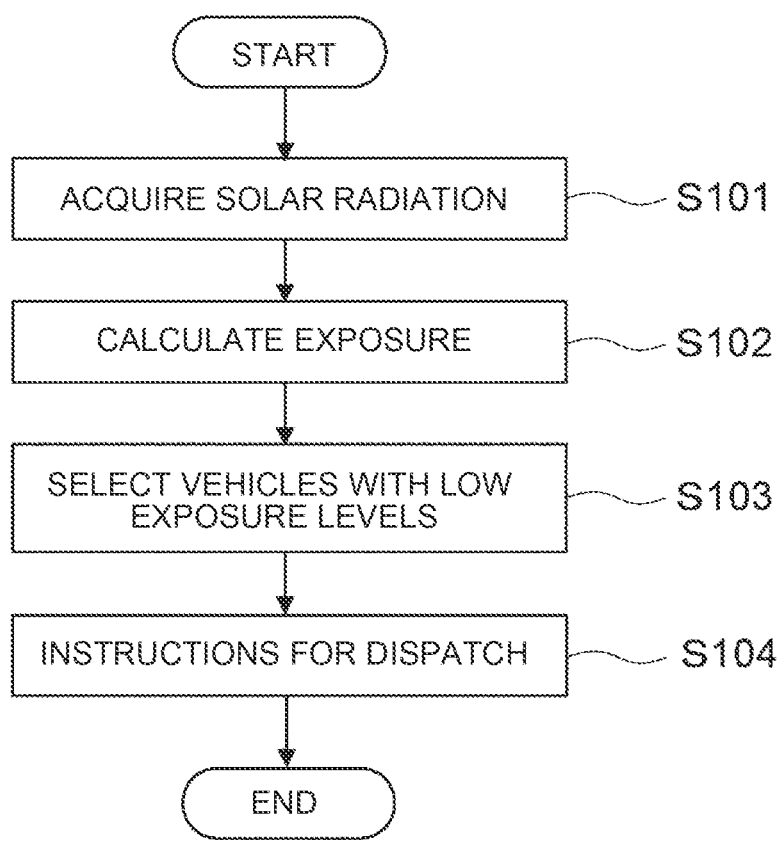
FIG. 3 is a flowchart illustrating a flow of processing performed by the dispatch management apparatus according to the first embodiment.

The dispatch instruction unit 34 gives a dispatch instruction to the selected vehicle 10.
Flow of Distribution Management Process As shown in FIG. 3, when the dispatch control process is started, the information acquisition unit 31 acquires the amount of solar radiation measured by the solar radiation meter 12 (S101). Next, the exposure amount calculation unit 32 calculates the cumulative exposure amount that the vehicles 10 have been exposed to (irradiated with) ultraviolet rays to date based on the amount of solar radiation measured by the solar radiation meter 12 (S102). Next, the selection unit 33 selects a vehicle 10 having a relatively small exposure amount among the plurality of vehicles 10 based on the exposure amount calculated by the exposure amount calculation unit 32 (S103). Next, the dispatch instruction unit 34 gives a dispatch instruction to the selected vehicles 10 (S104), and ends the dispatch control process.

Effects

The vehicle management system 1 according to the first embodiment includes an exposure amount calculation unit 32 that calculates an exposure amount due to ultraviolet rays of the vehicle 10, a selection unit 33 that selects one vehicle 10 from the plurality of vehicles 10 so that the exposure amount between the vehicles 10 is the same based on the exposure amount, and a dispatch instruction unit 34 that gives an instruction to dispatch the selected vehicle 10 (see FIG. 2).

By including a selection unit 33 that selects one vehicle 10 from the plurality of vehicles 10 and a dispatch instruction unit 34 that gives a dispatch instruction to the selected vehicle 10 so that the amount of exposure between the vehicles 10 is the same based on the amount of exposure, an instruction to dispatch is given to the vehicle 10 having a small amount of exposure. Therefore, the exposure amount between the vehicles 10 is adjusted to be the same. As a result, it is possible to balance the deterioration caused by the exposure to ultraviolet rays between the plurality of vehicles 10.

In the vehicle management system 1 according to the first embodiment, the exposure amount calculated by the exposure amount calculation unit 32 is defined as an ultraviolet dose of one day×the number of days.

The exposure amount calculated by the exposure amount calculation unit 32 is set to an ultraviolet dose of one day×the number of days, so that the exposure amount can be easily measured.

In the vehicle management system according to the first embodiment, each vehicle 10 includes a solar radiation meter 12 that measures the amount of solar radiation, and the exposure amount calculation unit 32 calculates the amount of exposure based on the amount of solar radiation (see FIG. 1).

The exposure amount calculation unit 32 can easily measure the exposure amount by calculating the exposure amount based on the solar radiation amount by the solar radiation meter.

The vehicle 10 according to the first embodiment is the vehicle 10 managed by the vehicle management system 1, and includes a display device 14 that displays an exposure amount (see FIG. 1).

By including the display device 14 for displaying the exposure amount, the exposure amount of ultraviolet rays is displayed on the vehicle 10. Therefore, for example, the exposure amount of ultraviolet rays can be used as a standard for maintenance. In addition, the exposure amount of ultraviolet rays can be used as an assessment criterion in the assessment of used vehicles.

Second Embodiment

The vehicle management system of the second embodiment is different from the vehicle management system of the first embodiment in that the flow of the dispatch management process is different. The vehicle management system 1 according to the second embodiment will be described as an example of a system that manages dispatch of vehicles as a plurality of solar cars including solar panels. Explanations of the same or equivalent parts as those described in the first embodiment will be described using the same terms or reference numerals.

Configuration of the Vehicle Management System 1

The vehicles 10 include a solar radiation meter 12 as a measurement meter, a display device 14, a communication unit 16, and a solar panel.

Functional Configuration of the Dispatch Management Device 20

In the dispatch management device 20, the amount of solar radiation measured by the solar radiation meter 12, and the amount of stored electricity stored by the solar panel via the network N, the control unit 30 via the control unit 30 processing information the dispatch management process is executed is outputted to the vehicle 10 via the network N.

The control unit 30 functionally includes an information acquisition unit 31, an exposure amount calculation unit 32, a selection unit 33, a dispatch instruction unit 34, and an electricity storage amount calculation unit.

The electric storage amount calculation unit calculates the electric storage amount by being stored by the solar panel. The selection unit 33 selects a vehicle 10 having a relatively small exposure amount and a relatively large storage amount among the plurality of vehicles 10 based on the exposure amount calculated by the exposure amount calculation unit 32 and the storage amount calculated by the storage amount calculation unit. The selection unit 33 selects one vehicle 10 from the plurality of vehicles 10 on the basis of the exposure amount calculated by the exposure amount calculation unit 32 and the storage amount calculated by the storage amount calculation unit so that the exposure amount between the vehicles 10 becomes the same and the storage amount between the vehicles 10 becomes the same.

Flow of Distribution Management Process

As shown in FIG. 5, when the dispatch control process is started, the information acquisition unit 31 acquires the amount of solar radiation measured by the solar radiation meter 12 (S201). Next, the exposure amount calculation unit 32 calculates the cumulative exposure amount that the vehicles 10 have been exposed to (irradiated with) ultraviolet rays to date based on the amount of solar radiation measured by the solar radiation meter 12 (S202). Next, the electric storage amount calculation unit calculates the electric storage amount by storing electric power by the solar panel (S203). Next, the selection unit 33 selects the vehicle 10 having a relatively small exposure amount and a relatively large storage amount among the plurality of vehicles 10 based on the exposure amount calculated by the exposure amount calculation unit 32 and the storage amount calculated by the storage amount calculation unit (S204). Next, the dispatch instruction unit 34 gives a dispatch instruction to the selected vehicles 10 (S205), and ends the dispatch control process.

Effects

The vehicle management system according to the second embodiment, the vehicle includes a solar panel, and the selection unit 33 selects one vehicle from the plurality of vehicles 10 so that the amount of electricity stored by the solar panel between the vehicles 10 is the same (see FIG. 5).

The selection unit 33 selects one vehicle 10 from the plurality of vehicles 10 so that the amount of electricity stored by the solar panels between the vehicles 10 is the same based on the amount of exposure, thereby giving an instruction to dispatch the vehicle 10 having a large amount of electricity. Therefore, the amount of electricity storage between the vehicles 10 is adjusted to be the same. As a result, the amount of electricity storage can be balanced among the plurality of vehicles 10.

Note that other configurations and operational effects are substantially the same as those of the first embodiment, and thus description thereof will be omitted.

The vehicle management system according to the embodiment has been described above based on the first embodiment and the second embodiment. However, the specific configuration is not limited to these embodiments, and changes in design and the like are allowed without departing from the gist of the invention according to each claim of the claims.

In the first embodiment and the second embodiment, the exposure amount calculation unit 32 has shown an example in which the cumulative exposure amount of each vehicle 10 exposed (irradiated) by ultraviolet rays to the present is calculated based on the solar radiation amount measured by the solar radiation meter 12. However, the exposure amount calculation unit may calculate the cumulative exposure amount that each vehicle has been exposed to (irradiated with) ultraviolet rays to date based on the amount of solar radiation measured by the ultraviolet ray measurement meter as the measurement meter.

In the first embodiment and the second embodiment, various processors other than CPU 21 may execute the process executed by CPU 21 reading the program. Examples of the processor include a Programmable Logic Device (PLD) in which a circuit configuration can be changed after manufacturing of Field-Programmable Gate Array (FPGA), and the like, and a dedicated electric circuit that is a processor having a circuit configuration designed exclusively for executing a particular process such as Application Spec Integrated Circuit (ASIC), and the like. Further, the above processing may be executed by one of these various processors, or may be executed by a combination of two or more processors of the same type or different types. For example, it may be executed by a plurality of FPGA, a combination of CPU and FPGA, or the like. The hardware structure of each of the various processors is, more specifically, an electric circuit in which circuit elements such as semiconductor elements are combined.

In the first embodiment and the second embodiment, various data are stored in the storage unit 24, but the present invention is not limited thereto. For example, a non-transitory recording medium such as Compact Disk (CD), Digital Versatile Disk (DVD), and Universal Serial Bus (USB) memories may be used as the storage unit. In this case, various programs, data, and the like are stored in these recording media.

The flow of the processing described in the first embodiment and the second embodiment is an example, and unnecessary steps may be deleted, new steps may be added, or the processing order may be changed without departing from the gist.

What is claimed is:

1. A vehicle management system comprising:
    an exposure amount calculation unit that calculates, for each of a plurality of vehicles, an exposure amount of ultraviolet rays;
    a selection unit that selects one vehicle from the plurality of vehicles, wherein the selection is performed to minimize a difference in the exposure amount among the plurality of vehicles is reduced over time; and
    a dispatch instruction unit that gives a dispatch instruction to the selected vehicle so that the amount of exposure between the vehicles is the same.

2. The vehicle management system according to claim 1, wherein the exposure amount calculated by the exposure amount calculation unit is an ultraviolet dose of one day×the number of days.

3. The vehicle management system according to claim 1, wherein:
    each of the vehicles includes a solar radiation meter that measures a solar radiation amount; and
    the exposure amount calculation unit calculates the exposure amount based on the solar radiation amount.

4. The vehicle management system according to claim 1, wherein:
    the vehicle includes a solar panel; and
    the selection unit selects one vehicle from the vehicles such that an amount of electricity storage by the solar panel between the vehicles is the same.

5. A vehicle managed by the vehicle management system according to claim 1, the vehicle comprising a display device that displays the exposure amount.

* * * * *